United States Patent Office 3,567,820
Patented Mar. 2, 1971

3,567,820
COMPOSITIONS AND TREATMENT FOR THE
ALLEVIATION OF DIAPER RASH
George S. Sperti, 1842 Madison Road,
Cincinnati, Ohio 45206
No Drawing. Continuation-in-part of application Ser. No. 523,542, Jan. 25, 1966. This application Apr. 9, 1969, Ser. No. 814,835
Int. Cl. A61k 15/02
U.S. Cl. 424—79
8 Claims

ABSTRACT OF THE DISCLOSURE

A method and composition for the prevention and alleviation of diaper rash whereby the skin is treated with a composition consisting essentially of a vehicle, a respiration stimulating factor, a cellular proliferation factor and a quantity of dispersed, finely divided cation exchange resin capable of absorbing ammonia and ammonium irritants.

CROSS-REFERENCE TO RELATED APPLICATION

This application is a continuation-in-part of the copending application in the name of the same inventor, Ser. No. 523,542, filed Jan. 25, 1966, and entitled Composition and Treatment for the Alleviation of Diaper Rash, now abandoned.

BACKGROUND OF THE INVENTION (1) Field of invention

The invention relates to a method and compositions for the prevention and alleviation of diaper rash.

(2) Description of the prior art

Diaper rash is a common form of irritation and inflammation of those parts of an infant's body normally covered by a diaper. It has hitherto been understood that while a water solution containing urea is not highly irritating to the skin, the maintenance of such a solution against the skin for any substantial length of time results in the decomposition of the urea, through the action of bacteria, with the production of ammonia and ammonium hydroxide. These substances are active skin irritants. Apparently a wide variety of species of bacteria is capable of promoting the decomposition of urea.

Heretofore the general approach to this problem has been to provide a composition which will set up a barrier layer on the skin against these irritants, and to include in the composition germicides acting against the bacteria causing the decomposition of the urea to ammonia and ammonium irritants.

Efforts, however, to inhibit such decomposition by the use of germicides have not been completely successful. A germicide can itself be irritating to the skin. Moreover, the discharge of urine is sufficiently voluminous, under ordinary circumstances, to saturate the diaper. It is not feasible, by way of an application of medicament to the skin of the infant, to build up in the entire volume of the urine a sufficient concentration of germicide to prevent the decomposition of the urea.

Ointments and lotions for the treatment of burns and the like have hitherto come into wide spread use. These treatment substances contain, in a suitable vehicle, a material acting as a stimulating factor for cellular respiration, and preferably also a material promoting cellular proliferation. These substances, acting together, promote the healing of lesions; tend to overcome the depression of cellular respiration by ingredients of the vehicle of the lotion or ointment; and have a certain germicidal effect.

The present invention provides compositions and a mode of treatment which will protect the skin of the infant from the action of ammonia and ammonium hydroxide when these substances are generated by the decomposition of urea and which preferably contain a cellular respiration stimulating factor and a cellular proliferation factor to promote healing.

SUMMARY OF THE INVENTION

Briefly, the invention contemplates a treatment composition which may contain a germicide and which comprises a non-therapeutic, substantially non-toxic, pharmaceutical vehicle, a cellular respiration stimulating factor, a cellular proliferation factor and a quantity of dispersed, finely divided cation exchange resin capable of absorbing ammonia and ammonium irritants. The composition is repeatedly applied topically to the affected areas of the skin.

DESCRIPTION OF THE PREFERRED EMBODIMENTS

The compositions of the present invention preferably make use of a non-therapeutic, substantially non-tonic, pharmaceutical vehicle of the type which will cling tightly to the skin when applied thereto so as to maintain a barrier against contact of ammonia and ammonium hydroxide with the skin.

While the present invention is not limited to its use, the compositions of this invention preferably contain a liquid silicone oil, because of the ability of such an oil to form an adhesive transparent film on the skin. Such a film is not easily displaceable; and it acts to protect the skin not only from direct contact with the urine but also from air which may irritate nerve endings in a raw, denuded skin surface which is the result of diaper rash. Also it has been found that a silicone oil serves as an excellent vehicle ingredient in combination with the other ingredients of the compositions. For purposes of the present invention any silicone oil regardless of viscosity may be used.

As indicated above, the compositions preferably contain a respiration stimulating factor. Substances which are advantageous in the promoting of cellular respiration are well known in the art. Such materials are organic in origin and complex in nature. The terms "respiration stimulating factor" or "respiration stimulating biodyne" as used herein and in the claims which follow, refers to cellular extracts prepared for example by extracting plant or animal matter with 80 percent ethyl alcohol, filtering or centrifuging, and evaporating the filtrate (or centrifugate) under reduced pressure to remove the alcohol and to concentrate the extract to any desired degree. Variations may be made in the procedure. For example, ethyl alcohol denatured with methyl alcohol may be used. An initial extraction with water, followed by addition of alcohol to 80 percent, may be employed and is especially useful for animal tissue. Various purification procedures, such as further extraction with ether to remov fat, adsorption or charcoal, precipitation with acetone, etc., may be useful. Various vegetable and animal materials may serve as sources, such as yeast, malt combings, spleen and liver. Respiratory activity is determined by assay in Warburg respirometers and the activity is expressed in terms of respiratory units. Examples of sources, processes, and assay may be found in:

United States Letters Patent 2,320,478 and 2,320,479;
Cook, Kreke and Nutini, Studies Institutum Divi Thomae, 2, 23 (1938);
Cook and Kreke, ibid. 2, 173 (1939);
Cook and Walter, ibid, 2, 189 (1939);
Cook and Kreke, ibid, 2, 215 (1939);
Cook and Walter, ibid. 2, 239 (1939);
Cook and Walter, ibid. 3, 39 (1941);
Cook and Walter, ibid. 3, 139 (1941);
Cook, Walter, Rack, Eiler, and Sawyer, ibid. 3, 147 (1941);
Ruddy, Arch. exp. Zellforsch, 22, 599 (1939); and
Cook and Kreke, Acta Unio intern. contra Cancrum, 7, 545 (1951).

In the compositions of the present invention, a respiration stimulating factor will be used in an amount up to about 2000 respiratory units per ounce of composition. One respiratory unit may be defined as that amount of the factor which will stimulate the respiration of rat skin by one percent in a Warburg respirometer under standard conditions.

The compositions of the present invention preferably contain up to about 3% of a cellular proliferation factor. As used herein and in the claims the term "cellular proliferation factor" refers to those well known factors comprising fish liver oil or vitamin A and D fish liver oil concentrates. Typical examples are cod liver oil or shark liver oil. United States Letters Patent No. 2,239,345 teaches the production of additional growth or proliferation factors which may be used in the present invention.

The compositions of the present invention may contain preservative agents such as methyl para-hydroxybenzoate and propyl para-hydroxybenzoate, incorporated in low percentages and used primarily for their preservative effect.

Preferably, the compositions of the present invention will contain a mild germicide.

When a mild germicide is incorporated it has been found that a germicide of the nature of halogenated phenolic compounds such as hexachlorophene and dichlorophene may be used. Other suitable germicides include phenolic compounds such as hexylresorcinol and resorcinol; mercurials including phenylmercuric nitrate, nitromersol and phimerosal; quaternary ammonium compounds such as benzalkonium chloride, benzethonium chloride, methylbenzethonium chloride, and cetyl pyridinium chloride.

The present invention is not limited to the use of germicides. In some compositions such substances may be omitted altogether as will later be shown. In no event should the amount of germicides incorporated in the compositions be sufficient to make the compositions irritating to the skin.

It may be stated that the respiration stimulating factor has hitherto been known to offset the toxic effects of a number of materials. Cosmetics, in general, are toxic to skin tissue because of the nature of their ingredients, as evidenced by a depression of the respiration of skin cells when tested in Warburg respirometers. Germicides not only exert toxic effects on bacteria, but also on skin tissues. In a proper combination the respiration stimulating factor not only reduces the toxicity of such substances for the skin, as shown by a return to normal or slightly accelerated cellular respiration, but often appears to enhance the action of the germicide.

As set forth above, no germicide has been found which, incorporated in compositions for application to the skin of infants, will completely eliminate all ammonia-forming organisms. As a consequence, the formation of ammonia irritants will take place if a urine-wet diaper remains for any substantial length of time in contact with the skin of an infant. In order to make such that the ammonia irritants do not reach the skin of the infant through the barrier layer, it is a preferred feature of the present invention to incorporate in the compositions a material which will absorb and deactivate ammonia irritants. Such a material has been found in the class of cation-exchange resins in which the initial cation is either hydrogen or an alkali metal such as sodium. Such resins have a high capacity for absorbing ammonia, which takes the place of tthe cation initially in the resin. While a resin having a hydrogen cation is preferred, it has been found that the amounts of alkali metal hydroxide which will be produced by the substition of an ammonium cation for an alkali metal cation are not actively irritating to the skin.

Such resins, in absorbing the ammonia, not only remove it as an irritant, but also serve another purpose. This purpose is to reduce the alkalinity of the overall composition and thus help to preserve the respiration stimulation factor which is less stable under alkaline conditions. Additionally, it is known that best healing is achieved when the damaged skin is maintained at a substantially neutral pH of about 7 to about 7.2, the normal physiological pH of the body tissues and fluids. The resins aid in the maintenance of this normal pH.

In the compositions of the present invention the resin should be present in an amount of at least 0.2%.

The compositions of this invention, in their preferred form, have a number of actions. They promote healing in instances where irritation or diaper rash has already taken place. They promote the destruction of bacteria without harmful action to the skin. They form a barrier layer preventing access of ammonia irritants to the skin. They form a palliative against the action of ammonia on the skin; and they absorb ammonia irritants which might otherwise tend to penetrate the barrier layer, and thereby additionally tend to preserve the respiratory factor in the composition. Finally, they had to maintain a normal pH of about 7 to about 7.2 which is essential for proper healing.

Example I.—A composition was made up in two parts as follows:

Part 1: (heat to 75° C.): Percent
    Dow corning oil 200 _____ 1.5
    Cetyl alcohol _____ 9.0
    Mineral oil _____ 20.0
    Cod liver oil conc. _____ 3.0
Part 2: (heat to 75° C.):
    Glycerine _____ 4.4
    Propylene glycol _____ 9.0
    Sodium lauryl sulfate _____ 1.0
    Methyl para-hydroxybenzoate _____ .25
    Propyl para-hydroxybenzoate _____ .15
    Dowex resin 50 W × 8 (Na or H) _____ 2.0
    Cellular respiration factor at 2000 respiratory unit per ounce of composition qs. with water to 3.0.
    Lavender perfume _____ .15
    Water distilled _____ 46.55

It will be noted that the two parts of the composition were made by mixing the ingredients of each at a temperature of about 75° C. The two parts were then cooled to a temperature of about 38° to about 40° C. and were incorporated together by mixing. The result was an ointment-like product which could readily be applied to the skin.

In the above formula the "Dow Corning Oil 200" is a silicone oil as set forth above. The cetyl alcohol, mineral oil, glycerine and propylene glycol are materials of an emolient and skin softening character. The sodium lauryl sulfate is a surface active agent assisting not only in the application of the ointment to the skin but also in the removal of the ointment from the skin by washing. The methyl parahydroxybenzoate and propyl para-hydroxybenzoate are preservative agents as described above, and may be used together because of their synergistic action. While the presence of these preservatives is desirable, particularly if no germicide is present, their incorporation in the compositions of the present invention is not essential. The "Dowex 50 W × 8" is the trade name under which one form of cation exchange resin is sold. Another suitable form of cation exchange resin is sold under the trade name "Dowex 50 × 8." The respiration stimulating factor is preferably used as indicated in an amount of 2,000 units per ounce of the composition. The cod liver oil concentrate is the proliferation factor mentioned above. Perfume is used to mask the odor of the respiration stimulating factor and the proliferation factor. It has been indicated as lavender, which may be obtained as a non-allergenic perfume from Givaudan. However, the specific perfume is not a limitation on the invention, although perfume substances which have an irritating effect should be avoided.

The product of this example has been tested in a number of cases of diaper rash with excellent results. It is preferably repeatedly applied to the skin of an infant at those parts of the body normally covered by a diaper; but it will be found effective if the application is limited to those parts of the skin where diaper rash has occurred or is most likely to occur. The results obtained have indicated an alleviation of the diaper rash where it has already occurred and a prevention of diaper rash in areas where the skin is clear and unirritated. These results are obtained despite the decomposition and consequent formation of ammonia irritants in the wetted diaper itself.

In the examples which follow, which are modifications of Example I, adjustments are made in the distilled water content to attain 100%. In any composition where the silicone oil would be omitted, adjustment would be made in the mineral oil content.

Example II.—A similar composition was made up with resin and with 0.5% hexachlorophene, and the results were comparable. As described above, the hexachlorophene serves as an active germicide.

Example III.—A similar composition was made up with resin and with 0.2% hexachlorophene, also with excellent results, indicating that the action of the resin is of greater importance than the action of the germicide.

It will be noted that the composition of Example I was made up containing resin but without a germicide such as hexachlorophene and good results were obtained. The vehicle of the composition plus the resin effectively prevented irritation by ammonia where the wetted diaper was not allowed to remain in place for undue lengths of time.

On the other hand, compostions containing no resin were found not to be as effective as compositions containing resin, either with or without a germicide. It is believed that the resin is highly effective in absorbing the ammonia irritants.

Modifications may be made in the above compositions. This is especially true as to the nature and quantity of emollient substances added. The skin softening effects of such substances are valuable in contributing to the comfort of the infant. The combination of a respiration stimulating factor and a cellular proliferation factor is highly effective in the preferred compositions of this invention; but in the quantities given are not likely to prevent skin irritation or to effect complete recovery from skin irritation if the ammonia irritants are not absorbed. Modifications may also be made in the above formulae to control the consistency of the ointment-like compositions for the sake of ease of application.

The resin is a solid and is used in the compositions in a very finely divided condition preferably having a particle size in the range of from about 200 to about 400 mesh. A mesh size of about 200 is the upper practical limit because larger particles would become mechanically irritating to the skin.

The two resins mentioned above are exemplary only. Any cation-exchange resin in which the initial cation is either hydrogen or an alkali metal and which is not mechanically or otherwise irritating to the skin can be used.

The compositions described herein may be considered as comprising a base or non-therapeutic, substantially non-toxic, pharmaceutical vehicle and active ingredients. In these compositions, cetyl alcohol, mineral oil, glycerine, propylene glycol, sodium lauryl sulfate, methyl para-hydroxybenzoate, propyl para-hydroxybenzoate, lavender perfume and distilled water comprise the base materials or vehicle, while the respiration stimulating factor, cellular proliferation factor, germacide and resin comprise the active ingredients. When silicone oil is used, it may be considered both as a base material and an active ingredient in a physical sense in that it forms an adhesive barrier to protect the skin from the irritating effects of harmful urinary products and air.

The embodiments of the invention in which an exclusive property or privilege is claimed are defined as follows:

1. A topical composition for the prevention and alleviation of diaper rash consisting essentially of a non-therapeutic, substantially non-toxic pharmaceutical vehicle, a respiration stimulating biodyne in an amount of about 2000 respiratory units per ounce of said composition, fish liver oil in an amount of about 3% of said composition and a quantity of finely divided cation exchange resin in which the initial cation is an alkali metal, said resin having a partical size of up to about 200 mesh, said resin being present in an amount of from about 0.2% to about 2.0% of said composition.

2. The composition claimed in claim 1 including 0.1% to 0.5% hexachlorophene.

3. A composition for the prevention and alleviation of diaper rash consisting of the following ingredients in approximately the following proportions:

| | Percent |
|---|---|
| Liquid silicone oil | 1.5 |
| Cetyl alcohol | 9.0 |
| Mineral oil | 20.0 |
| Fish liver oil | 3.0 |
| Glycerine | 4.4 |
| Propylene glycol | 9.0 |
| Sodium lauryl sulfate | 1.0 |
| Cation exchange resin in which the initial cation is alkali metal | 2.0 |
| Respiration stimulating biodyne | 3.0 |
| Perfume | .15 |

The balance being distilled water.

4. The composition claimed in claim 3 including 0.1% to 0.5% hexachlorophene.

5. The composition claimed in claim 3 including .25% methyl para-hydroxybenzoate and .15% propyl para-hydroxybenzoate.

6. The composition claimed in claim 5 including 0.1% to 0.5% hexachlorophene.

7. A process of treating the skin for the prevention and alleviation of diaper rash which comprises repeatedly treating the skin in areas subject to contact with a unrinesaturated diaper with a composition consting essentially of a non-therapeutic, substantially non-toxic pharmaceutical vehicle, a respiration simulating biodyne in an amount of about 200 respiratory units per ounce of said composition, fish liver oil in an amount of about 3% of said composition and a quantity of finely divided cation exchange resin in which the initial cation is an alkali metal, said resin having a particle size of up to about 200 mesh, said resin being present in an amount of from about 0.2% to about 2.0% of said composition.

8. The process claimed in claim 7 wherein said composition includes 0.1% to 0.5% hexachlorophene.

References Cited

UNITED STATES PATENTS 2,320,479  6/1943  Sperti _____ 424—195
2,919,230  12/1959  Thurmon _____ 424—79

OTHER REFERENCES

Kahan et al.: Archives of Pediatrics, vol. 73, pp. 125–129, 1956.

Percival, J. Soc. Cosmetic Chemists, vol. 13, pp. 291–299, 1962.

RICHARD L. HUFF, Primary Examiner

U.S. Cl. X.R.

424—184, 195